July 6, 1965  R. L. HOLLINGSWORTH  3,193,214
AIR-LAND-SEA-SPACE TRANSPORTATION CRAFT
Filed Feb. 28, 1961  2 Sheets-Sheet 1
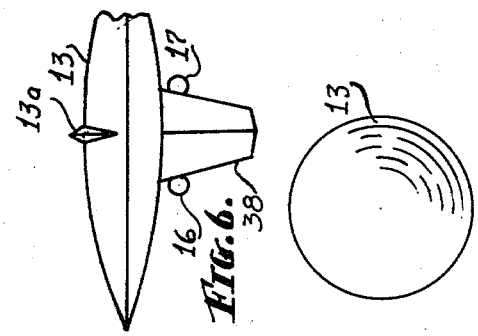
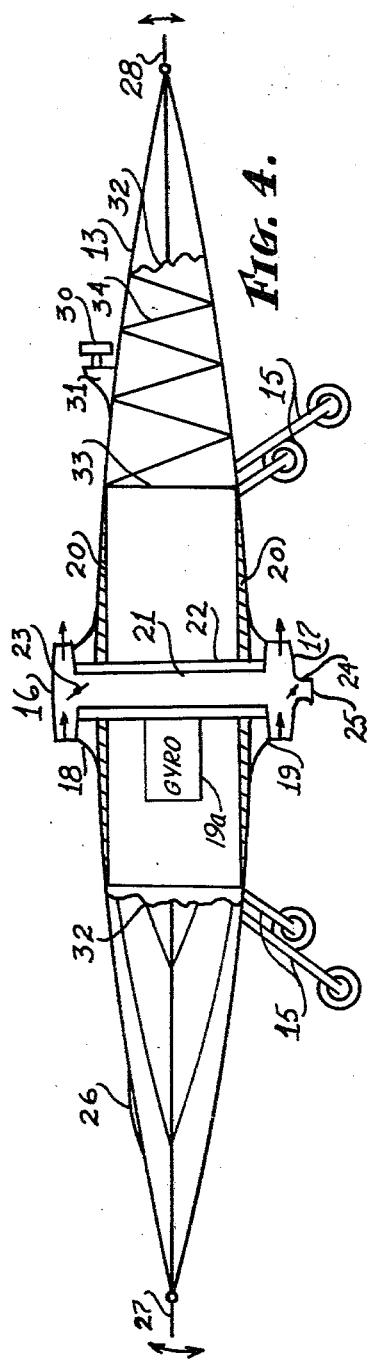
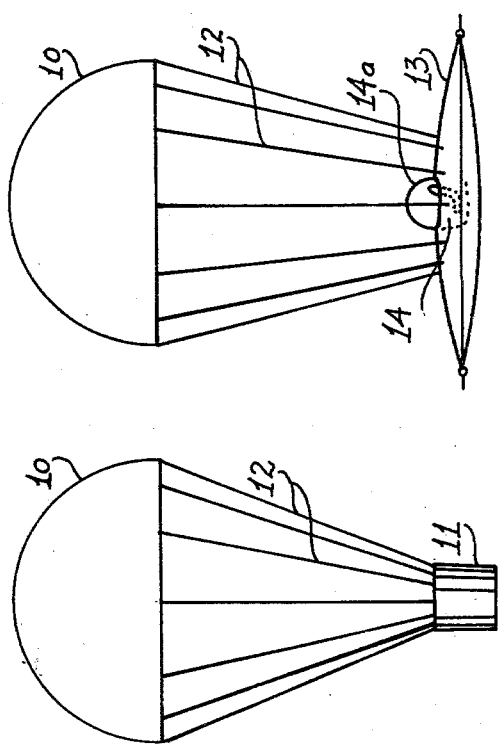
R. Lee Hollingsworth INVENTOR.

July 6, 1965  R. L. HOLLINGSWORTH  3,193,214
AIR-LAND-SEA-SPACE TRANSPORTATION CRAFT
Filed Feb. 28, 1961  2 Sheets-Sheet 2
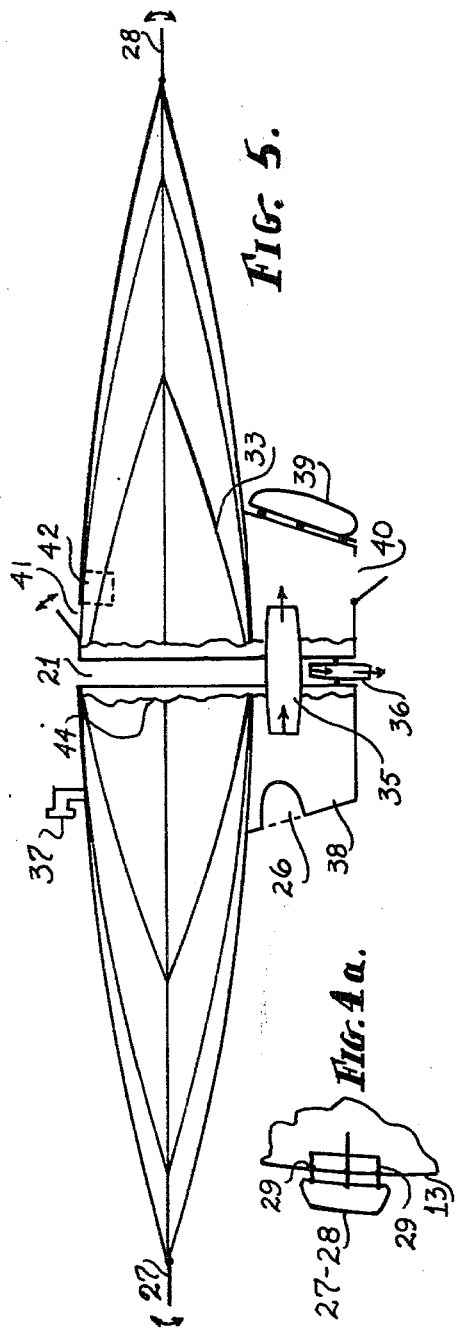
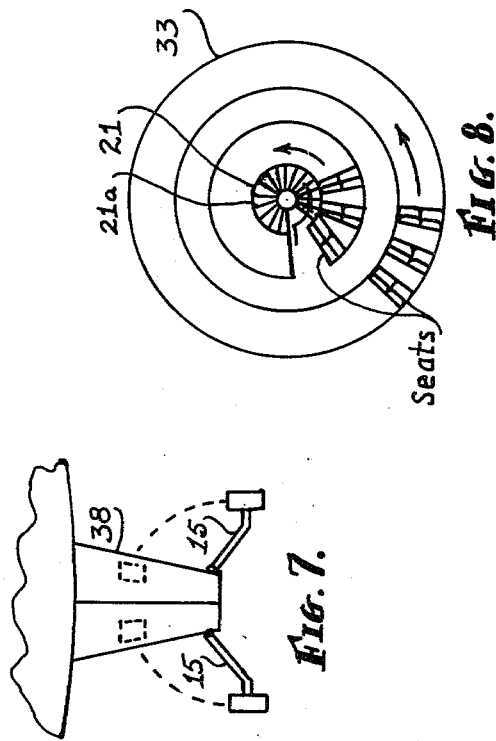
R. Lee Hollingsworth — INVENTOR.

United States Patent Office 3,193,214
Patented July 6, 1965

3,193,214
AIR-LAND-SEA-SPACE TRANSPORTATION CRAFT
R. Lee Hollingsworth, Massapequa, N.Y.
(514 Hempstead Ave., West Hempstead, N.Y.)
Filed Feb. 28, 1961, Ser. No. 110,283
13 Claims. (Cl. 244—12)

The present invention relates primarily to vertical takeoff and vertical landing type airplanes. The invention also relates to means for slower speeds for airplanes on takeoff and landing capable of attaining high cruising speeds upon reaching a desired altitude. The invention further relates to specific design to provide streamlining of a craft for travel in air and water.

The basic principles of the safety features of the present invention was demonstrated and used many years ago by balloons that were filled with heated gases to cause their ascent, having a stabilizing weight center in its bottom area formed by the gondola and the weight of the parachute jumper. The parachute itself in the act of slowly dropping the jumper back to earth demonstrated this principle of slow vertical landing, except that the present invention provides new methods and techniques of both takeoffs and landings pertaining to airplanes.

The present invention provides an airplane that by virtue of its design and shape, can land substantially along a vertical plane with respect to the earth's surface, with downward automatically controlled thrust causing the descent to be slow. This same design particularly with parachute assist, can land without downward thrust power, with little or no damage to the craft, and possibly without injury to persons aboard.

The invention also provides a flying device capable of tight circling around a small landing area at reduced speeds to arrive at a point of touchdown at very slow speeds. The device also has relatively low cross wind resistance due to its streamlined design features.

The present invention also provides a means for attachment from the airplane to the ground to further insure landing stability in high winds, and means comprising a lowered and stabilizing center of gravity extendable below the airplane, and may comprise a shock absorbing mechanism. The landing gear is symbolic of this lowered center of gravity in further stabilizing the descent during landings and to provide aforesaid shock absorbing means.

The present invention further provides an aircraft having a streamlined circular wing lift area formed or fabricated in a manner of two shallow cones fitted together face to face, the area within forming the inner supporting structure and the area for passengers. An escape exit hatch is provided at the top for emergency use.

The invention also provides a craft capable of landing and travelling in water, and remaining afloat indefinitely. When specifically built as a seaplane or for amphibious use, the craft becomes a versatile aircraft capable of landing in small lakes or prepared landing pools.

Furthermore, the invention provides a craft comprising a houseboat or cruiser which may have fluid power thrust, or conventional underwater propelling means.

The invention also comprises a space travel ship capable of being adapted to firing rockets, or carrying a number of rockets for firing after the ship has been flying or orbiting for a period of time. When contemplated for space travel uses, the craft can be adapted to fly heavy loads towards upper space, and at a desired height and speed be then thrust into space by added thrust applied for a short period of time, thus alleviating the blast-off techniques presently used in rocketry.

The invention assembled, or its fabricated parts ready for assembly provides a toy and hobby craft, said parts preferably made by molding and stamping.

The description of the present invention follows with reference to the drawings wherein:

FIGURE 1 illustrates a parachute floating downward, illustrating a basic concept of vertical landing.

FIGURE 2 illustrates a parachute landing assist means which could be constructed and used in accordance with the principles applied in the present invention for airplanes, gliders, kites and toys.

FIGURE 3 illustrates a frontal view of one of the shallow cones that are fitted together to make the gravity resistive structure of FIGURE 2, yet be streamlined in the vertical plane during ascent or descent.

FIGURE 4 illustrates one preferred structure of the present invention. When built to land on, and then travel on water, the propulsion means is built only on the top area. An airplane or a submarine built in this shape would be difficult to detect by radar or by sonar, since the reflected waves would not return to the source of transmission directly, if at all.

FIGURE 4A shows a top view of control means 27 and 28.

FIGURE 5 illustrates a side view of another preferred embodiment of the present invention.

FIGURE 6 shows a view of FIGURE 5 taken from the front or rear illustrating the manner in which the propulsion motors are mounted preferably to extend partially into the gondola for accessibility during flight if necessary.

FIGURE 7 illustrates the folding landing gear that stores during flight within the gondola wall area.

FIGURE 8 illustrates a preferred cabin arrangement within the craft.

The detailed description of the present invention follows, and reference is first made to FIGURE 1, which illustrates a parachute in descent from a balloon or airplane. The parachute 10, when pulled by gondola 11, by cords 12 attached to the parachute and to the gondola, develops resistance to gravity due to the inability of the air within the parachute to rapidly escape around the perimeter of the bottom of the parachute. This is representative of basic non-powered vertical landing.

FIGURE 2 further illustrates the present invention wherein the main cargo or passenger carrying structure 13 according to the present invention may have a releasable parachute to lower the craft slowly towards the earth as illustrated. Streamlined structure 13 is round and resembles two very shallow cones fitted together to provide homogeneous streamlining over the top and bottom of the craft. The combination cargo carrying and wing support structure 13 also comprises the entire area of the craft, unless auxiliary wing supporting means be added if and when needed. Propulsion and steering means is set forth hereinafter. The parachute landing or parachute assist landing means comprising parachute 10 and cords 12 show a way to effectively provide vertical landing or vertical assist landing for a craft of a design generally shaped to offer maximum resistance to gravity which is directly additive to the parachute resistance to gravity. Here two separate force-additive elements of gravity resistance to descent is provided. When the parachute is gathered in and secured, the structure 13 is then a streamlined structure for takeoff and high speed flight. Storage area 14 houses the parachute and flyer during glider flights until needed particularly for emergency landings or assist vertical landings. This type of an airplane could carry a heavy load from a relatively short runway utilizing vertical takeoff thrust, and land the load vertically in an open space, and after unloading, rise up from the downward thrust and fly away. It is to be appreciated that this circular streamlined airplane needs vertical lifting power only sufficient to slowly raise the craft a few feet above the ground at which time forward thrust starts the craft forward and upward, at speeds dictated by the pilot or by automatic flight control means on or off of the airplane. Runways for this type of airplane need not be as long as for airplanes presently in use. A skillful forward upbank slows this type of airplane to a very slow speed near the landing strip and the point of touch down. Extremely slow, tight circle spiralled landings can also be accomplished with this craft. So called stacking can be accomplished in very limited air space.

FIGURE 3 shows the shallow cone shaped half of an ideally fabricated section 13 of the airplane where made of plastics or fibre glass. The view is looking into the depth of one of the two shallow cone sections that makes up area 13 when fitted together. Fabrication of the parts to be assembled by children and hobbyists are best accomplished by injection molding or vacuum forming techniques; however, good models of the shallow cone areas have been made by cutting out a circle of thin, rigid material and cutting a narrow tapering triangle from the perimeter to the center and then closing the triangle area forming a cone that comprises one half of structure 13 of FIGURE 2. Gliders when made in accordance with the present invention may be made of extremely light materials, and be so narrow in the vertical plane, that the pilot would sit with his head and shoulders above the center of the structure 13, preferably covered by a plastic bubble 14a. An airplane so constructed would fly well with low power driving thrust or propulsion.

Thus far I have described airplanes, gliders and toys built in accordance with the features of the present invention for hobbyists, glider pilots and amateur fliers. I shall now describe the invention showing added features which allow the airplane to be built strong and for utilization for high speed flying suitable for business, military, passenger and freight transport and other uses such as crop spraying and irrigation from the air, and for flying into space within the solar system, utilizing high speed thrust power for a short period of time upon entering the region of outer space shortly before leaving the earth's atmosphere.

FIGURE 4 shows one preferred embodiment of the invention wherein structure 13 is constructed over a strong framework 34 comprising a radial section which radiates from the circular cabin structure 33 to the outer sharp edged perimeter of the wing structure area 13. Wheel landing gear means 15 folds out and downward from the craft forming preferably a four point landing area to provide stable landing and supporting means for the airplane when landing and at rest on the ground. During flight, these wheels are folded or retracted into the structure 13. Fluid jet motors 16 and 17 are preferably located on the bottom and top of the structure 13, being attached to reinforced mounts 18 and 19, which are securely built over the top and bottom of the reinforced cabin area 33. The motors comprise a thrust or propulsion means which could also be a propelling means such as a motor driven propeller or of expanding rocket fuel. The pressurized cabin 33 is supported through its center by a straight hollow supporting pipe 21 which is heat insulated by insulated casing 22 through which the intake and exhaust of motors 16 and 17 passes a part of the time when down thrust is used. Gating or valving means 23 and 24 can be adjusted to supply the required thrust through exhaust nozzle 25, which comprises the lowest point of the craft in flight to provide vertical lift during takeoff and landing. The cockpit 26 is located forward. It may connect with the pressurized cabin 33 or be individually pressurized. Ascend-descend control means 27 and 28 are located on the front and rear perimeter of structure 13 and are controlled from the cockpit 26 to provide horizontal control and trim control as the airplane slips through the air. These controls 27 and 28 being located on the perimeter of structure 13 are extremely sensitive, and so long as the airplane is in motion even with no forward power supplied, they are capable of unusually good control of the airplane's forward progress motion because of the double action leverage across the airplane's center of gravity at its center. When over controlled, this control means 27 and 28 noses or tails down the airplane; therefore, they are preferably automatically controlled by gyro mechanism or an oil pendulum, or oil pendulum electric switch levelling control means that operates ascend-descend control means 27 and 28 by energizing a motor to supply the leverage power to these controls to insure stable and accurate operation.

FIGURE 4a shows a view from the top of control means 27 and 28 viewed through a cutaway area of structure 13. These control means are securely mounted through the perimeter of structure 13 by hinge means 29 that are commonly connected to a suitable lever operating means inside structure 13 the details of which are not shown since it is a common mechanical function. In the stream of fluid jet 16 there is shown a sensitive lateral control 30 which is mounted securely in frame supporting structure means 31. This control is hinged to supporting member 31. The circular cabin wall is indicated at 33. Control 30 is operated from the cockpit in usual fashion. Cutaway portions of structure 13 is shown at 32. It is intended that a lower weight center be established for the airplane before takeoff and that the entire airplane be in part automatically stabilized by the pendulum action around the lower weight center and/or by a gyro stabilizer 19a. The motors 16 and 17 may be mounted on structure 13 in various areas to best suit the needs of a particular size of the airplane. To conform with full anti-radar detection the intake and exhaust of the motors may be flattened and the motors mounted within structure 13. The airplane of this embodiment of the invention operates or flies substantially as a conventional airplane, except that the vertical downward thrust is controlled to cause the airplane to rise from a standing still position, or rise after a short run. On landing, the airplane may descend around a tight circle at rather slow speeds and upon nearing the ground, fly straight for a moment and touch down. Numeral 34 shows one form of constructing the inner framework supporting section of structure 13, which isc onstructed of metal, laminated plywood with a multiplicty of holes to reduce weight, composition honeycomb sheets of plastics or aluminum to insure strength and lightness. It is to be appreciated that a small airplane of from ten to twenty feet in diameter may be made of two formed shallow cones of plastic or fibre glass, for the top and bottom of area 13 of the airplane, not untilizing the inner structural forms 34. An airplane for high speed would probably require up to sixty-four of these structures 34 to insure great strength. Structure 34 would be then covered with a thin, tightly drawn and welded covering to provide the overall shape of structure 13. Strong floor and ceiling area for cabin 33 is shown at 20.

Another preferred embodiment of the invention is shown in FIGURE 5 wherein a streamlined gondola 38 is built below the cabin area 33 to contain the cockpit, flight and baggage room, creating a low center of gravity for the airplane. The structure radiates from the stabilizing and lifting air pipe 21 which, in this embodiment of the invention contains a jet motor, that is pivotally mounted and controlled, as an air or jet motor propelling means 36 being fitted into the lower section of pipe 21 to provide downward thrust for takeoff and landing below the center of gravity. The landing gear folds out of this gondola 38, or drops out of the wing area 13, being preferably a four point landing means. Within or about the exhaust nozzle of fluid jet motor 36, there is located a deflecting means controlled from the cockpit to provide means for controlling the airplane laterally when landing and taking off, thus assisting the stabilizing means to keep the airplane on a level plane as it is near the ground. The said deflecting means is symbolized by the steering means 30 of FIGURE 4 which is in the exhaust stream of motor 16. This may be accomplished by tilting the motor 36 on its pivot means. Fluid jet motors 35 are mounted on both sides and preferably inset into the walls of the gondola or flight room, and all oil and lubricating lines, and fire extinguisher lines that extend into the motors, have their connections and control and stop valves, available to the flight engineer if trouble of any kind develops that can be remedied or repaired. These fluid jet motors 35 can be hinged or pivoted so that they can be swung inside the flight room of the gondola for repairs if required. The operating conditions for retracting the motor into the gondola for inspection, servicing and repairs would require that the craft be slowed, and possibly lowered the required amount towards the earth, to adjust for pressure differences inside and outside of the gondola. There are numerous ways that the motor may be mounted so as to be brought into the gondola, and I choose to describe these mechanisms as suitable known mechanical means to accomplish the purpose, namely, that of moving a motor from an operating position outside of an aircraft, to the inside of the craft where the motor may be inspected, serviced, repaired or replaced. Rudder 39 controls the ship's or the airplane's heading, and it is not intended that airplanes of this type, when carrying passengers, bank on turns as deep as conventional passenger airplanes, since the large rudder can turn the airplane in the direction desired and the motors give the thrust to cause the airplane to head instantly in the direction desired, as the craft turns very easily. A view by the pilot of the airplane from the top area is made possible by a periscope 37. The passengers enter the airplane preferably through drop door area 40, and from a small foyer, ascend up a winding stair, FIGURE 8 at 21a is attached to and supported by pipe means 21. This stairway 21a extends to the escape hatch 41 via the cabin area immediately above the gondola 38. Cutaway area 44 of structure 13 permits the showing of air pipe 21. In event all power fails on the airplane and a landing is imminent, the pilot would lower the landing gear to lower the center of gravity below the gondola, and try to maneuver, if possible, over an unobstructed area. A large parachute housed in compartment 42 near the escape hatch is fed out through the said escape hatch, or another special parachute hatch (not shown) to assist the vertical no-power emergency landing. The shape of the airplane, plus the parachute provides so much resistance to gravity that the crash would not be as serious as the crash landing of a conventional airplane. Any available wind could be utilized by a pilot to lessen the crash impact. Special cabin construction further reduces casualties.

The principles of airplane flight are valid for this round, bi-conical-like streamlined craft. On moving forward, if the airplane is controlled to rise, after the takeoff assist jet is stopped, or converted to forward thrust, there would be the tendency to create a vacuum across the upper rear area 13, thus providing the lifting power for the airplane in substantially the usual manner. Airplanes constructed according to the present invention may be small but highly maneuverable. Approach and landing speeds could be greatly reduced by coming in at a forward to aft bank until near the point of touchdown. Although not shown, landing flaps may be used. For this type of landing, substantially full length, round pipe and flexible ski-like runners (not shown) may well suffice as a landing gear means, particularly on grass or dirt landing strips.

FIGURE 6 shows a front or back view of the overall streamlined structure, showing that the propulsion means 16 and 17 are preferably partially embedded in the wall structure of the gondola. This wall area of the gondola is suitable for mounting supports for a multiplicity of small motors thereon instead of two large motors as illustrated. Across the top of structure 13 running fore and aft, stabilizing streamlined ridges 13a may be constructed to assist in lateral stability particularly when travelling at low speeds with cross winds exerting substantially equal pressure on the top and bottom of structure 13, including the area of the gondola 38 which is relatively heavy, and this weight comprises the main stabilizing factor of the airplane, and consequently the streamlined ridge or ridges across the top need not be too high above structure 13.

FIGURE 7 is illustrative of landing gear that folds into the gondola. The directional arrows illustrate the direction that wheels 15 take when folding into the gondola 38. This feature is considered new and novel since the flight crew can work on the mechanisms instantly if they fail to function as they should, whereas conventional airplanes often have trouble with their landing gear and cannot remedy same.

FIGURE 8 shows a novel layout of the passenger cabin, which has the hollow central pipe 21 around which the winding stairs 21a is built. An inner and outer row of seats are provided as illustrated. The floor, ceiling and the seating booths are unique in that these portions including everything that one may come in contact with is covered with very thick foam rubber, or fabricated vinyl plastic material that is permanently sealed off into separate sealed pressure areas, being sealed under pressure, as described in my pending patent application Serial No. 83,500, Jan. 11, 1961, "Sectional Sealed-Off Inflated Linear Tubing and Extruding and Sealing Means for Manufacturing Purposes" now Patent 3,126,581. Foam rubber is provided for the floor, ceiling and covering for every supporting and exposed means and area. The upholstery and seat belts made of the vinyl plastic in accordance with the above patent application, including seat belts, helps to avoid injuries and reduce fatalities. In case of a crash landing, the injured are helped by the uninjured through the escape hatch, and they reach the ground at a convenient point around the perimeter of structure 13. If there be a fire, the passengers and crew may be able to reach the ground at a point around the perimeter of structure 13 away from the fire. It would appear that this type of airplane may be somewhat safer than conventional airplanes. If the airplane is required to land in water, and the gondola and the cabin is not torn, the airplane would remain afloat indefinitely, as waves would tend to flow over the streamlined craft. The inside area of 13 may contain a distributed quantity of the vinyl tubing having a great number of sealed off compartments to render the airplane unsinkable.

In FIGURES 4 and 5 the straight air pipe connecting vertically through the center of the airplane comprises a new and novel effect, as well as a central supporting means for the cabin area. In the prior art that shows fan lifters through relatively narrow wing areas, relatively poor efficiency is provided. Analogy of the present invention in this respect can be compared to a large shallow cone loud speaker unit that is relatively rigid, and which has additional baffle area such as would comprise a baffle area of 100%, which avoids back-to-front and vice versa air pressure interference, which degenerates the power of the low frequencies of the sound waves to be produced, if sufficient baffle area is not present around the cone. The air pumped or sucked from the top area of an airplane in accordance with the present invention, and discharged with increased thrust generated by the downward thrust means exhausting below the structure provides full lifting efficiency. This feature comprises the creation of substantially an isolated vacuum above the airplane and a multiplied pressure in the form of generated thrust below the airplane which causes it to lift into the air before forward thrust is applied, if true vertical takeoff is desired.

It is to be appreciated, that ships to travel on or under the surface of water, may take this general design shape in accordance with the present invention and that radar and sonar signal reflections are for the most part reflected away from the search transmitter-receiver. A submarine constructed according to the concept of the present invention, and having a knife edge circle around the perimeter, with flattened intake and exhausts such as they too present a knife sharp edge effectively, could approach an attack area, making it difficult to detect the approach.

Where jet engines are utilized in aircraft, and in rockets, the intake and/or the exhaust area may take the form of a flattened lateral expanded area. The fast movement of gases through an exhaust of this type generates resistance to the change in the direction in which the craft is moving, therefore subsantial stability is inherent for the craft that utilizes this type of intake and/or exhaust means.

While I have described the present invention in considerable detail, many changes and additions are possible in carrying the invention into practice, particularly as to the placement on the airplane or craft of the motors and control means.

It is to be appreciated that for toy and hobby work, that strings may be connected to control the attitude of these airplanes when fabricated for toy or hobby use, and that they may be also wave energy controlled from the ground or from another airplane.

A particular feature of the seat belts of the present invention is that the seat belt buckles or hooks are made of at least in part of permanent magnets whereby the seat belt may be quickly or easily unfastened particularly to release an injured person. The variations of the size and shape of two belt hooks or detachable belt buckle means is substantially infinite, therefore I choose to describe the magnetic belt buckle attachment as a magnetic means for fastening and holding two ends of a belt means together to insure the attachment being permanent until disengaged by hand.

The antiradar detection features of the present invention suggests a system of radar where the transmission reflections are detected beyond the object. Accurately clock timed transmissions and accurately clock timed diversity detection locations determines the distance and direction to the object via a computing translator means.

I claim for my invention:

1. A space transportation craft having propulsion means, a multiplicity of steering means, a streamlined composite body and wing structure, said structure exteriorly formed in all directions from a vertical center pipe supporting means, said composite body and wing structure resembling the shape of two round shallow cones the outer perimeter of which forms a circle having a sharp edge around said perimeter, a gondola attached to the bottom of said structure for piloting facilities of said craft, jet motors mounted on said gondola, an area within said craft for transporting a load, stabilizing means projected above said craft running lengthwise parallel with the length of said gondola of said craft, a landing gear means foldable out of said gondola for landing and to form and comprise a lowered center of gravity means to vertically stabilize said craft when taking off and landing, a straight passage extending vertically through said pipe and supporting means of said craft, a tiltable jet turbine motor means mounted in said passage near the bottom of said passage to develop lifting and stabilizing thrust for vertical takeoffs and landings, said thrust exhausted below said craft in an area of free directional movement of said thrust.

2. The invention of claim 1, wherein the said area within said craft for transporting a load comprises a cabin area accessible via a winding stairway around said pipe and supporting means from within said gondola, said stairway extending also to an escape hatch above the said cabin.

3. A space transportation craft having propulsion means mounted above and below said craft, a multiplicity of steering means, a streamlined composite body and wing structure, said structure exteriorly formed in all directions from a vertical center supporting pipe, said composite body and wing structure resembling the shape of two round shallow cones the outer perimeter of which forms a circle and sharp edge around said perimeter, an area within said craft for piloting said craft and to carry a load, a landing gear means foldable out of said craft for landing and to form and comprise a lowered center of gravity means to vertically stabilize said craft when landing, said propulsion means mounted on top and bottom of said craft, a vertical supporting pipe forming a straight passage through said craft from top to bottom and connected between said propulsion means and extended and opened beyond said propulsion means mounted on the bottom of said craft, controlled gating means for admitting thrust from said propelling means into said passage as controlled thrust generated by said propulsion means to pass out of the bottom of said passage for lifting and stabilizing said craft during takeoffs and landings of said craft.

4. An amphibious aircraft and water craft having fluid turbine propulsion means mounted above the waterline, a plurality of steering means, a streamlined composite body and wing structure, said structure exteriorly formed in all directions from a vertical center supporting pipe means, said composite body and wing structure resembling the shape of two round shallow cones the outer perimeter of which forms a circle and sharp edge around said perimeter, an area within said craft for piloting said craft and to carry a load, a landing gear means foldable out of said craft for landing and to form and comprise a lowered center of gravity to vertically stabilize said craft in air and water, an exhaust passage extending from said propulsion means through the bottom of said craft and gating means to control the exhaust through said passage.

5. An amphibious aircraft having combustion turbine propulsion means mounted above the waterline, a steering and control means for said craft, an area within said craft for piloting said craft and to carry a load, a landing gear means foldable out of said craft for landing and to comprise a lowered center of gravity to stabilize said craft, an exhaust passage extending from said propulsion means through the bottom of said craft and gating means to control the exhaust through said passage.

6. The invention of claim 1 wherein the outside structure is metallic and smoothed such that substantially all transmitted wave energy striking the craft is reflected in directions other than towards the transmitter of said wave energy.

7. The invention of claim 3 wherein the outside structure is metallic and shaped and smoothed such that substantially all transmitted wave energy striking the craft is reflected in directions other than towards the transmitter of said wave energy.

8. The invention of claim 1 wherein a parachute is housed near the top of the craft for use as auxiliary emergency vertical landing assist means in event of failure of the tiltable vertical thrust jet turbine means, said parachute connected to said craft to keep the craft at maximum resistance to the pull of gravity as the craft descends to earth, said craft shaped to add descent resistance to that of said parachute.

9. The invention according to claim 1 wherein the propulsion means comprises a plurality of fluid turbine motors mounted outside of the gondola on retractable means for retracting said motors into said gondola for changing and repairing said motors.

10. The invention of claim 1 including a flight stabilization means comprising a gyroscope.

11. The invention of claim 3 including a flight stabilization means comprising a gyroscope.

12. The invention in accordance with claim 1 wherein said downward thrust is provided by a fluid combustion motor means the exhaust of which is directed upon a stabilizing rudder means.

13. A transportation craft for air and sea travel according to claim 4 constructed of smooth surfaced metal which is shaped such that substantially all transmitted radar, sonar and detecting wave energy striking the surface of the craft is reflected in directions other than towards the transmitter of said wave energy and said craft comprising facing shallow circular cones peripherally united along their contacting edges and means for propelling and guiding said craft.

References Cited by the Examiner

UNITED STATES PATENTS

| | | | |
|---|---|---|---|
| 1,307,414 | 6/19 | Paulauski | 244—54 |
| 2,567,392 | 9/51 | Naught | 244—52 X |
| 2,571,586 | 10/51 | Lane | 244—73 X |
| 2,621,871 | 12/52 | Robert | 244—52 |
| 2,715,001 | 8/55 | Provenzano | 244—118 |
| 2,726,829 | 12/55 | Hillis | 244—12 |
| 2,755,043 | 7/56 | Holm | 244—122 |
| 2,762,584 | 9/56 | Price | 244—12 |
| 2,772,057 | 11/56 | Fischer | 244—52 X |
| 2,788,184 | 4/57 | Michael | 244—53 |
| 2,797,883 | 7/57 | Martin | 244—122 |
| 2,801,058 | 7/57 | Lent | 244—12 |
| 2,801,411 | 7/57 | Weinstock | 343—18 |
| 2,829,846 | 4/58 | Keiper | 244—139 X |
| 2,927,746 | 3/60 | Mellen | 244—12 |
| 2,945,642 | 7/60 | Nofi | 244—12 |
| 2,953,320 | 9/60 | Parry | 244—12 |
| 2,959,374 | 11/60 | Laskowitz | 244—52 X |
| 2,960,292 | 11/60 | Pitta | 244—118 |
| 2,969,941 | 1/61 | Hobart | 244—53 |
| 3,061,241 | 10/62 | Holland | 244—23 |
| 3,066,890 | 12/62 | Price | 244—12 X |

FOREIGN PATENTS 518,844  9/55  Italy.
533,751  9/55  Italy.

OTHER REFERENCES

Radar System Engineering, N.Y., 1947, page 69.

MILTON BUCHLER, *Primary Examiner.*

RALPH D. BLAKESLEE, EMILE PAUL, *Examiners.*